Oct. 20, 1925.
C. J. THOMPSON
AUGER AND BIT
Filed Sept. 8, 1924
1,557,900
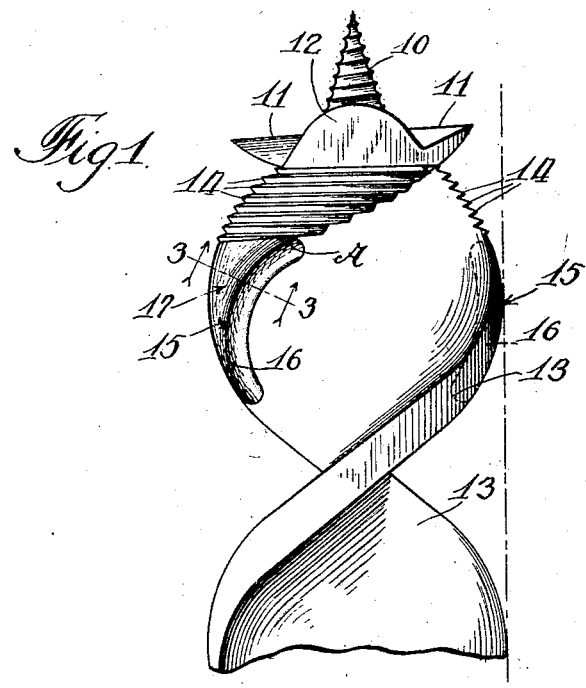
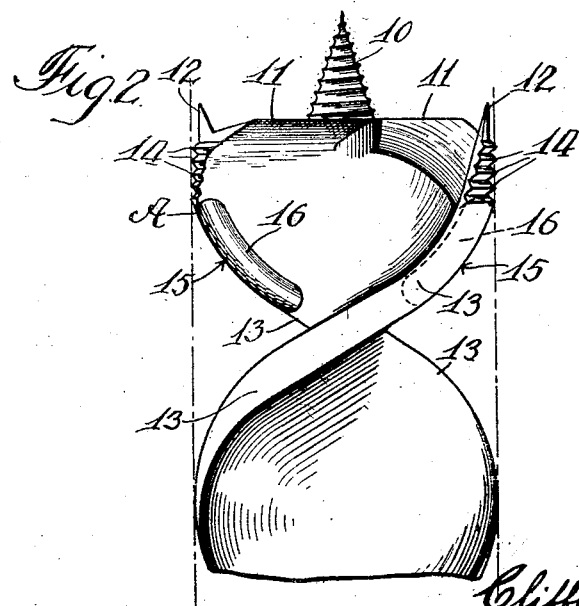
Inventor:
Clifford J. Thompson
By Luther Johns
Atty.

Patented Oct. 20, 1925.

1,557,900

UNITED STATES PATENT OFFICE.

CLIFFORD J. THOMPSON, OF CHICAGO, ILLINOIS, ASSIGNOR OF ONE-HALF TO THOMAS J. HOLMES, OF CHICAGO, ILLINOIS.

AUGER AND BIT.

Application filed September 8, 1924. Serial No. 736,386.

*To all whom it may concern:*

Be it known that I, CLIFFORD J. THOMPSON, a citizen of the United States, residing at Chicago, Cook County, Illinois, have invented certain new and useful Improvements in Augers and Bits, of which the following is a specification, reference being had to the accompanying drawings, forming part hereof.

These improvements relate to wood-boring tools ordinarily known as augers and bits. The principal objects of the invention are to increase efficiency, provide new and advantageous results, and effect a saving of time and labor in the use of such tools provided with screw-thread elements adjacent and posterior to the front cutters, as on the periphery of the spiral ribs or vanes. Other objects and advantages will appear hereinafter.

In the drawings, Figure 1 shows forward end portions of an auger or bit according to these improvements; Fig. 2 shows the same fragment as it would appear turned ninety degrees on its axis; and Fig. 3 is a fragmentary section on the line 3—3 of Fig. 1.

It is old to provide a boring tool having a threaded point as 10, with front cutters as 11 and 12, and with spiral ribs as 13 having thereon screw-thread elements as 14 near and posterior to the forward cutters. The object of thread elements as 14 is to provide means additional to the point 10 for leading the instrument into the wood, the threads 14 indenting or cutting the wood in the bore and forming threads therein as the tool is being used.

In practice it is frequently necessary to retract the instrument from the hole being made—to clear the channels of the tool of impacted cuttings, to ascertain the depth of the hole being made, because of obstructions encountered, etc. Since, according to the old practice, the threads as 14 produce screw threads throughout the length of the bore, the instrument becomes strongly locked in the bore against retraction except by rotating the tool in the reverse direction. Where the boring is substantially deep such removal is a tedious operation and is not the most effective way to relieve the congested condition of the shavings or to remove them, and further objection exists in the fact that the hole as finally bored contains screw-threaded walls instead of the smooth cylindrical walls usually desired.

According to these improvements I provide an auxiliary cutter or cutters having a cutting edge respectively as 15 posterior to the threads 14 on the spiral vanes or ribs 13 adapted to cut away the thread formation in the wood and reform the bore into a smooth cylindrical one as the boring proceeds.

The sharp edge 15 preferably has substantial length, beginning at A, and may be formed by providing an undercut, groove or recess 16 in the vanes 13 adjacent to the outer or peripheral edges thereof, and, preferably, by slanting away the outer periphery of the vanes respectively as at 17, as well shown in Fig. 3, to provide some clearance there and to give the cutter substantially a knife edge. While, theoretically, that portion of the cutting edge 15 which is immediately posterior to the thread elements 14 removes the threads in the wood, through dulling of the more forward portions of the cutters 15 the following portions become effective, and thus where the cutters 15 are integral with the body of the tool, and therefore non-adjustable, the efficiency of the tool in this respect will be continued throughout the normal life of any of the instrument's parts.

As will be apparent from the dotted line in Fig. 1, the cutting edge 15 is at the same radial distance from the axis of the tool as are the peripheral edge portions of the body, namely the spiral vanes 13; and from the dotted lines of Fig. 2 it will be observed that the apices or crowns of the thread elements 14 are also at the same radial distance from the axis as are the marginal edges of the vanes 13. The construction in this respect will be clear if we conceive that the marginal edges of the vanes were turned or ground while the bit was being rotated on its axis so that the geometrical projection of the bit upon a plane at right angles to the axis would show the same circular formation at all horizontal sections of the bit, and that thereafter thread grooves were cut in the vane edges leaving the apices of the thread elements 14 at the same radial elevation as the outer periphery of the vanes; and by assuming further that thereafter the cutting edge 15 was formed, as shown for instance in Fig. 3, with the cutting edge at the same radial elevation as the apices of the threads 14.

According to the construction illustrated and described, as the bit is advanced into the wood, the cutting edges 15 clear away the ridges produced in the wood by the threads 14. When it is desired to retract the bit from the partially-bored hole it is still necessary to reverse its direction, but only for a few turns—sufficiently to release the instrument from the threaded portion of the wood—and thereupon it may be drawn out axially, with the most effective withdrawal of the shavings and with a very notable saving of time.

The bit may thus be removed and reinserted at a very slight expense of time and labor as often as may seem desirable. Finally the point 10 will issue from the opposite side of the work, whereupon the threads 14 will continue to exert a pulling effect upon the tool and will continue to force the cutters 11 and 12 into the work until they also emerge. At such time a few more turns of the bit carry the cutting edges 15 through the remaining screw threads in the wood, with the result that a smooth and cylindrical hole has now been bored.

It will be noted from Fig. 2 that the cutters 12 do not have quite as much outward or radial elevation measured from the axis as do the crowns of the threads 14. The hole in the work produced by the cutters 12 is therefore slightly smaller than the finished hole will be. The construction in this respect provides material immediately posterior to the cutters 12 into which the threads 14 may make their way.

The knives or cutters providing the cutting edges 15 respectively merely cut away the threads formed in the wood, and since these edges are preferably on the spiral lines of the vanes as shown, they attack the threads in the wood with a slanting cut or with a shaving action well adapted to produce a smooth wall.

The cutters 15 are shown as being integral with the body of the tool, but other constructions may advantageously be employed.

Reference should be had to the appended claims to determine what I contemplate as being included in the improvements herein set forth.

I claim:

1. A wood-boring tool having a leading-in screw and cutting elements at its forward end for producing a hole slightly less in diameter than the hole to be bored and having screw-thread elements defining substantially the radius of the hole to be bored and positioned posterior to said cutting elements for engaging the wood and leading the tool forward when in use, and a cutter posterior to said thread elements for cutting away the threads produced in the wood by said thread elements when the tool is normally used.

2. A wood-boring tool of the character described having a leading-in screw and cutting elements at its forward end, spiral vanes on the body, and screw-thread elements on the periphery of said vanes near the front end of the tool for engaging the wood and leading the tool forward when in use, and a cutter posterior to said thread elements for cutting away the threads produced in the wood by said thread elements when the tool is normally used.

3. A wood-boring tool of the character described having a threaded point, cutters posterior to said point, spiral vanes on the body of the tool, screw-thread elements on the periphery of said vanes near the front end of the tool and posterior to said cutters for engaging the wood and leading the tool forward when in use, and a cutter integral with the vanes respectively and positioned posterior to said thread elements for cutting away the threads produced in the wood by said thread elements when the tool is normally used.

4. A wood-boring tool having cutting elements at its front end for producing a hole slightly less in diameter than the hole to be bored and having screw-thread elements projecting substantially the thickness of the threads radially beyond and positioned posterior to said cutting elements for engaging the wood and leading the tool forward when in use, and a cutter posterior to said thread elements and arranged slantingly with respect to the axis of the tool and having its cutting edge at substantially the same distance from the axis as are the apices of said thread elements respectively for cutting away the threads produced in the work by said thread elements when the tool is normally used.

CLIFFORD J. THOMPSON.